Figure 1:
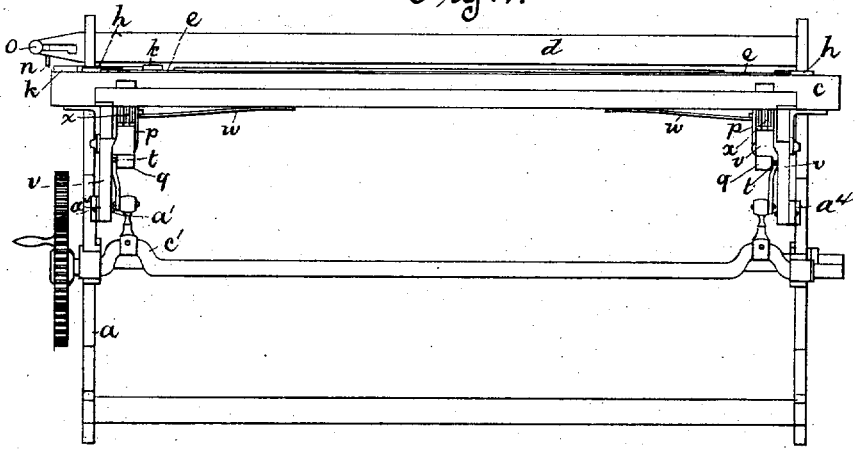

G. CROMPTON.

Weft Stop Motions for Looms.

No. 9,610. Reissued March 22, 1881.

Witnesses.

L. F. Lozier.

N. E. C. Whitney.

Inventor

George Crompton by Crosby & Gregory

Attys

N. PETERS, PHOTO-LITHOGRAPHER, WASHINGTON, D. C.

UNITED STATES PATENT OFFICE.

GEORGE CROMPTON, OF WORCESTER, MASSACHUSETTS.

WEFT-STOP-MOTION FOR LOOMS.

SPECIFICATION forming part of Reissued Letters Patent No. 9,610, dated March 22, 1881.

Original No. 69,974, dated October 22, 1867. Application for reissue filed February 2, 1880.

*To all whom it may concern:*

Be it known that I, GEORGE CROMPTON, of Worcester, in the county of Worcester, State of Massachusetts, have invented an Improvement in Weft-Stop-Motions for Looms; and I do hereby declare that the following, taken in connection with the drawings which accompany and form part of this specification, is a description of my invention sufficient to enable those skilled in the art to practice it.

The invention relates to mechanism for automatically stopping a loom of the Crompton class whenever the shuttle or weft-thread breaks.

In this my invention I have pivoted upon the lay two gravitating grids having prongs extended horizontally across the raceway of the lay, the tail-pieces of the grids being sufficiently heavy to keep their pronged parts elevated. I have also pivoted upon and at the rear of the lay two weft-feelers having horizontal prongs extended across the raceway of the lay above the grids, and at the rear of, but independent of, the lay I have located or placed means to act upon the tail-pieces of the weft-feelers during the forward movement of the lay to move the forked ends of the said feelers downward toward the grids. By moving the weft-feelers down and toward the race of the lay, rather than upward, I am enabled to keep the weft down upon those warps nearest the race of the lay; and the weft, when beaten up by the reed of the lay, is moved forward horizontally, or nearly so, directly to the cloth-making point with the least amount of friction.

I have placed a grid and feeler at each end of the lay, and have provided means for operating both feelers at every pick, which makes it possible to readily detect a break in the shuttle-thread at either side of the web being woven. A shuttle moving from a box at the right-hand end of the lay into a box at the left-hand end of the lay has its shuttle-thread felt for outside the left-hand selvage, and a shuttle moving from a box at the left-hand side of the lay to a box at the right-hand side of the lay has the thread felt for outside the right-hand selvage. If a shuttle passes through the shed from either the right or left hand side of the lay and immediately returns in the next shed, it is obvious that the thread of that shuttle will not be extended over the grid at that side of the warps into which the shuttle started on its return movement; and consequently, if means were not provided for such emergency, the weft-feeler coming down upon the grid outside at that edge of the warps, it not having a thread laid across it, would stop the loom, although the shuttle-thread was not broken.

I have herein shown the weft-feelers at both ends of the lay as being operated at the same time, each one descending toward the grid under it after each pick, and the two feelers are operatively connected in such manner that the belt-shipper cannot be moved to stop the loom, except when the shuttle-thread is wanting above both grids; or, in other words, the absence of the weft from that grid at that side of the warps from which the shuttle started in its flight through the shed will not alone be sufficient to stop the loom.

Figure 2:
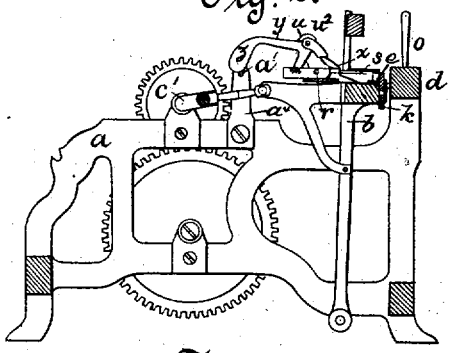
Figure 3:
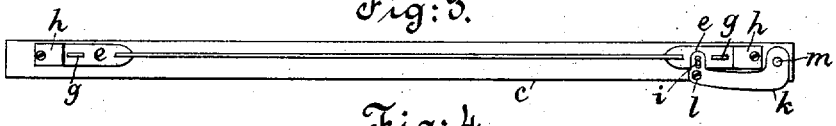
Figure 4:
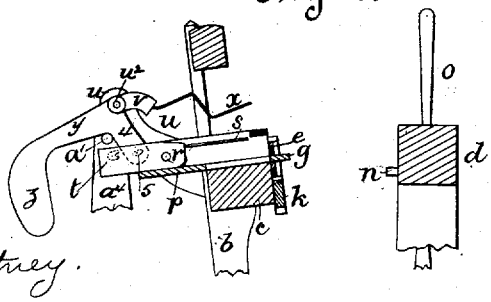

Figure 1 represents in plan view a sufficient portion of a loom to illustrate my invention, the usual shuttle-boxes at each end of the lay being omitted from the drawings; Fig. 2, a vertical cross-section of Fig. 1; Fig. 3, a front view of the lay-beam; and Fig. 4, a sectional detail taken through the lay and breast-beam, showing the grid and feeler in side view, the feeler being elevated.

*a* denotes the loom-frame; *b*, the lay common to the Crompton or other fancy loom, the lay being driven by the shaft *c'*, in the usual manner. *c* is the lay-beam over which the shuttle flies; *d*, the breast-beam.

At the front face of the lay-beam *c*, and near each end thereof, I have placed a slotted slide-plate, *e*. The slide-plate *e*, suitably supported at the front of the lay, is slotted at each end, and each slot receives a tooth, *g*, of one of the carriages *p*, the said teeth being extended through the lay-beam *c* into said slots. The slide-plate *e* is connected by a pin, *i*, with a rocker-plate, *k*, hung upon a pin, *l*, of the lay. The rocker-plate has a hole, *m*, which at every forward movement of the lay (when the weft-thread is unbroken) is maintained in position to be entered by a pin, *n*, of the shipper-lever *o*. When the lay beats up, if the rocker-plate varies at all from its normal position just referred to, the pin *n*, instead of entering the hole *m*, will be struck by the face of the said plate, and the shipper-lever will be thereby pressed out from its usual holding-notch. Each tooth *g* projects from a sliding carriage, *p*, held in the lay-beam.

Each carriage serves to support a grid, *s*, the prongs of which are extended forward from the pivot *r* across the lay toward the breast-beam, while the tail-piece or backward extension of the grid is located at the rear of the lay. The tail-piece of each grid is provided with a projection, *t*, and each carriage is held pushed forward by means of a spring, *w*. The feelers *v*, pivoted at $u^2$ upon standards or arms *u* carried by the lay, have prongs *x*, located above the grids and projected forward across the lay toward the breast-beam. The tail-pieces *y* of the feelers, extended backward from the lay, are weighted at *z* to hold the prongs *x* normally in elevated position; but as the lay beats up the curved lower sides of the tail-pieces *y* strike a stud, *a'*, extended in from a bracket, $a^4$, supported on the loom-frame *a*, tipping up the rear end or arm of the tail-piece *y* and carrying the prongs of the grid into the lay-beam *c*.

Each weft-feeler has an arm, 4, provided with a pin, 5, which, as the lay moves forward, strikes the pin *t* of the grid below it, provided the prongs of the feeler, in their descent toward and through the spaces between the prongs of the grid *s*, do not strike a weft-thread. Should a weft-thread be present on the prongs of the grid, the latter will be depressed, and its tail-piece will be elevated sufficiently to place the pin *t* out of the line of movement of the pin 5 of the arm 4 of the feeler. When a pin, 5, of a weft-feeler at one end of the lay is permitted to strike a pin, *t*, the weft-feeler and carriage or slide *p*, on which it is pivoted, will be drawn backward to remove the finger *g* of that carriage from the opening in the slide-plate *e* in which it extended; but it will be noticed that the said slide-plate cannot move longitudinally and let the plate *k* drop by removing but one finger, *g*, for the other finger, yet in engagement with the slide-plate at its opposite end, will prevent longitudinal movement thereof. Should a shuttle be thrown across in one shed and back in the next shed, it would not leave a thread extended across that grid at that end of the lay from which the shuttle last started, and, as described, if the grid and carriage at that side are drawn back the loom will not be stopped.

It will be noticed that the teeth *g* at each end of the lay must be drawn back from both slots of the slide-plate *e* before it can be moved longitudinally to permit the plate *k* to drop and operate the belt-shipper handle and stop the loom, and this can only be done when the weft is absent from above both of the grids. I depend for the release of the shipper handle or lever upon the absence of weft from above both grids, as the feelers, operated at every pick, descend to the level of the grid. When, in the operation of the loom, two shuttles are thrown in succession from the same end of the lay, the weft-feeler at the opposite end of the lay, it being operated at each pick, prevents the loom from being stopped.

In my loom each grid moves independently of the other, and is located just below the level of the race of the lay, and is so balanced as to be sensitive to the finest felling; whereas, if both grids were connected, the weft must be strong enough to move both grids and the connections between them under the action of the feeler.

It will be noticed in this my invention that both the grid and feeler are pivoted upon and moved with the lay; that the grid serves as a yielding support for the weft laid upon it; that the main parts of the weft-stop mechanism are kept at the back of the lay, so as to be out of the way, and that there is a grid and feeler at each end of the lay, each connected with the other and with the belt-shipper, so that the loom is especially designed for operation where there are drop-shuttle boxes at each end of the lay.

By pivoting the grid upon the lay I am enabled to secure most delicate action of the feeler and grid, adapting the devices to the lightest weft.

I claim—

1. In a weft-stop mechanism for a loom, the lay, a pivoted grid and feeler at each end thereof, and means to operate both of said feelers at every pick, and a shipper-lever, combined with the carriages for the grids and means intermediate between the said carriages and shipper-lever, to permit one grid to remain up as the lay is moved forward without stopping the loom, substantially as described.

2. In a loom, the lay, two gravitating pivoted grids thereon, having prongs extended horizontally across the raceway of the lay, the tail-pieces of the grids being sufficiently heavy to keep their pronged parts elevated, two weft-feelers having their pivots at the rear of and made movable with the lay, and having horizontal prongs extended across the raceway of the lay above the grids, combined with means located at the rear of, but independent of, the lay to act upon the tail-pieces of the weft-feelers during the forward movement of the lay and move the forked ends of the weft-feelers downward toward the grids, such combination enabling the weft-feelers to keep the weft down upon those warps nearest the race of the lay, and permitting the weft to be moved horizontally forward, or nearly so, to the cloth-making point with the least amount of friction between the warp and weft and the grid, substantially as described.

GEO. CROMPTON.

Witnesses:
J. B. SYME,
J. A. WARE.